(12) United States Patent
Kramer

(10) Patent No.: US 9,428,222 B2
(45) Date of Patent: Aug. 30, 2016

(54) AUXILIARY FRAME FOR A MOTOR VEHICLE

(71) Applicant: AUDI AG, Ingolstadt (DE)

(72) Inventor: Tobias Kramer, Stammham (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/759,869

(22) PCT Filed: Dec. 14, 2013

(86) PCT No.: PCT/EP2013/003782
§ 371 (c)(1),
(2) Date: Jul. 8, 2015

(87) PCT Pub. No.: WO2014/108157
PCT Pub. Date: Jul. 17, 2014

(65) Prior Publication Data
US 2015/0353136 A1    Dec. 10, 2015

(30) Foreign Application Priority Data

Jan. 10, 2013    (DE) .................... 10 2013 000 357

(51) Int. Cl.
*B62D 21/11* (2006.01)
*B62D 21/10* (2006.01)
*B62D 65/00* (2006.01)

(52) U.S. Cl.
CPC ............... *B62D 21/11* (2013.01); *B62D 21/10* (2013.01); *B62D 65/00* (2013.01); *Y10T 29/49906* (2015.01)

(58) Field of Classification Search
CPC ...... B62D 21/10; B62D 21/11; B62D 65/00; B60G 2206/60; Y10T 29/49906

USPC .......................................................... 296/204
See application file for complete search history.

(56) References Cited

U.S. PATENT DOCUMENTS 6,398,262 B1 * 6/2002 Ziech ..................... B60G 3/20
                                                    180/311
6,623,020 B1   9/2003 Satou
(Continued)

FOREIGN PATENT DOCUMENTS

DE    195 32 531    3/1997
DE    101 07 960    8/2002
(Continued)

OTHER PUBLICATIONS

International Search Report issued by the European Patent Office in International Application PCT/EP2013/003782.

*Primary Examiner* — Pinel Romain
(74) *Attorney, Agent, or Firm* — Henry M. Feiereisen LLC

(57) ABSTRACT

An auxiliary frame for a motor vehicle, includes two front joint elements, spaced apart in transverse direction of the vehicle and configured for attachment to a vehicle body; a front cross member connecting the two front joint elements; a reinforcement element, having rear joint elements spaced apart in the transverse direction of the vehicle for attachment to the vehicle body, wherein the reinforcement element is mounted at first connection sites on the two front joint elements so as to be spaced apart from the front cross member by an offset in longitudinal direction of the vehicle; and at least one support leg extending the reinforcement element forwards in the longitudinal direction of the vehicle, and being connected to the front cross member at a second connection site and bridging the longitudinal offset.

20 Claims, 3 Drawing Sheets

(56) References Cited

U.S. PATENT DOCUMENTS

| | | | | |
|---|---|---|---|---|
| 7,946,377 B2 * | 5/2011 | Frasch | ............... | B62D 21/11 180/312 |
| 9,079,620 B2 * | 7/2015 | Komiya | ............... | B62D 21/11 |

FOREIGN PATENT DOCUMENTS

| | | |
|---|---|---|
| DE | 101 09 636 | 9/2002 |
| DE | 10 2005 017 031 | 10/2006 |
| DE | 10 2006 009 289 | 10/2007 |
| DE | 10 2007 012 148 | 9/2008 |
| DE | 10 2009 041 771 | 3/2011 |
| DE | 10 2010 033 333 | 2/2012 |
| DE | 10 2011 101 408 | 5/2012 |
| DE | 10 2011 106 250 | 1/2013 |
| EP | 1 690 779 | 8/2006 |

* cited by examiner

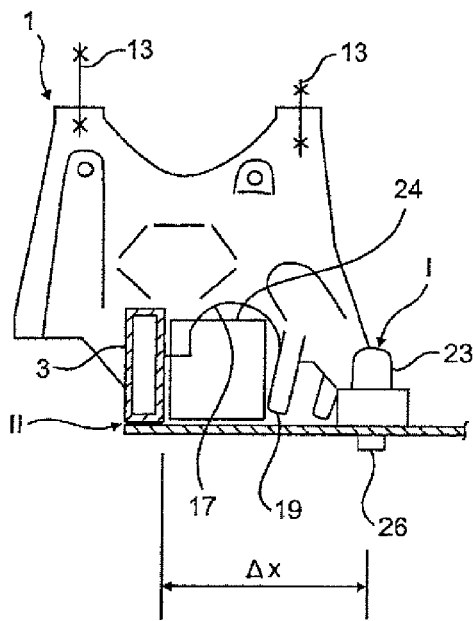
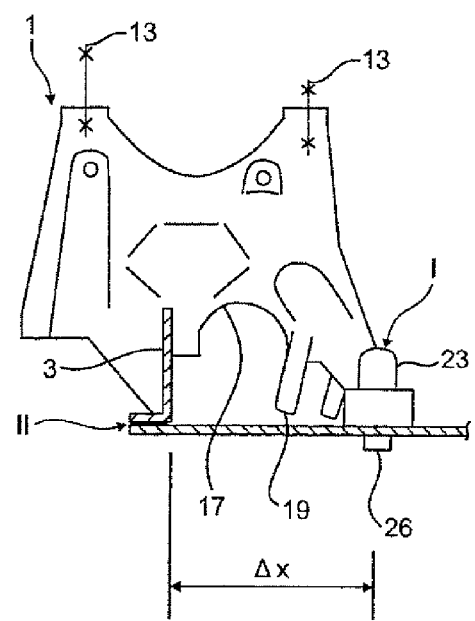

AUXILIARY FRAME FOR A MOTOR VEHICLE

CROSS-REFERENCES TO RELATED APPLICATIONS

This application is the U.S. National Stage of International Application No. PCT/EP2013/003782, filed Dec. 14, 2013, which designated the United States and has been published as International Publication No. WO 2014/108157 and which claims the priority of German Patent Application, Serial No. 10 2013 000 357.1, filed Jan. 10, 2013, pursuant to 35 U.S.C. 119(a)-(d).

BACKGROUND OF THE INVENTION

The invention relates to an auxiliary frame for a motor vehicle as well as a method of assembly of such an auxiliary frame.

An auxiliary frame for a motor vehicle that is formed as a subframe, which is also described as axle support, is generally known and is regularly used as a drive unit carrier, which is screwed to the vehicle body via corresponding connection sites, i.e., to the longitudinal members of the vehicle body as well as for example to joint sites of the A-pillar that are situated at the floor. Such auxiliary frames can be used both in the region of the front axles and in the region of the rear axles.

From DE 10 2011 101 408 A1 a generic auxiliary frame for a motor vehicle is known, which for example has a rectangular-shaped closed frame, in which the front and rear cross members as well as the lateral longitudinal members are connected to each other via joint elements such as aluminum cast joints. At the front and rear cast joints, respective connection points are provided to screw the auxiliary frame to the vehicle body. Additionally, further functions are integrated at the front and rear cast joints, for example control arm consoles for the control arms of the wheel suspension. The auxiliary frame known from DE 10 2011 101 408 A1 also includes a reinforcement element that is designed as a cross strut, within which the rear cast joints may be formed integrally. At its front end the reinforcement element is connected at first connection sites, for example threaded bushings, to the front cast joints. The two front cast joints are furthermore connected to each other via the front cross member. The front cross member is arranged with a longitudinal offset before the above mentioned first connection sites (or before the reinforcement element). Especially in the region of the front cross member high forces are introduced during operation. As a result a the front cross member has to be constructed using a great amount of material, i.e., so as to have great wall thicknesses, to meet component stiffness requirements.

SUMMARY OF THE INVENTION

Object of the invention is to provide an auxiliary frame for a motor vehicle as well as a method to produce such an auxiliary frame, in which the component stiffness of the auxiliary frame is increased in a simple manner.

The object is achieved by an auxiliary frame for a motor vehicle, including two front joint elements, spaced apart in transverse direction of the vehicle and configured for attachment to a vehicle body; a front cross member connecting the two front joint elements; a reinforcement element, having rear joint elements spaced apart in the transverse direction of the vehicle for attachment to the vehicle body, wherein the reinforcement element is mounted at first connection sites on the two front joint elements so as to be spaced apart from the front cross member by an offset in longitudinal direction of the vehicle; and at least one support leg extending the reinforcement element forwards in the longitudinal direction of the vehicle, and being connected to the front cross member at a second connection site and bridging the longitudinal offset 1. Advantageous embodiments of the invention are disclosed by the sub claims.

The invention is based on the fact that despite the front cross member and the flat, plate-shaped stiffening element, the component stiffness of the auxiliary frame may be problematic, especially at higher levels of motorization. Against this background, according to the characterizing part of patent claim 1, the reinforcement element is extended frontward in longitudinal direction of the vehicle by a support leg. The support leg is rigidly connected to the front cross member at a second connection site so as to bridge the above mentioned longitudinal offset. The connection of the support leg to the front cross member may be detachable, for example by using a screw connection, or non-detachable, for example by way of a welding connection.

The second connection site between the support leg of the reinforcement element and the front cross member can be positioned in transverse direction of the vehicle between the two front joint elements. The additional connection of the reinforcement element to the front cross member provides a further load path, by which the forces occurring during operation can be introduced from the front cross member into the reinforcement element, thereby significantly increasing the component stiffness of the auxiliary frame.

In an embodiment, the support leg can be made of a uniform material and/or configured as a one-piece component of the reinforcement element. The support leg can essentially extend in horizontal direction. The support leg may also be configured as a flat section, for example as a plate-shaped, flat extension of the reinforcement element (e.g. a metal plate). Additionally, the reinforcement part can have rear joint elements which are spaced apart in transverse direction of the vehicle, and by which the auxiliary frame can be connected to the vehicle body. The reinforcement element can extend with its entire surface between the front and rear joint elements. Alternatively, the reinforcement element can be provided with diagonally and/or longitudinally extending struts, which are arranged in framework structure or as a cross strut.

To further increase the component stiffness, the front cross member—as opposed to the support leg of the reinforcement element—can be designed not as a flat section with horizontal orientation, but rather as an on edge section which is installed in vertical direction of the vehicle. Furthermore, the subframe of the reinforcement element can be mounted on the bottom side of the front cross member. This results in a stiffening structure with an approximately L-shaped cross section, comprising the horizontal support leg and the vertically upwards arranged front cross member.

In order to further increase the component stiffness, the front cross member may have a closed hollow section. Alternatively, the front cross section can be designed as an open angled section, which frees up further installation space, for example for arranging a steering gear or other components of the chassis that take up installation space, for example a rotary actuator.

The installation space for such a steering gear can advantageously be provided in longitudinal direction of the vehicle behind the front cross member. It is advantageous, when the installation space for the steering gear is delimited toward the bottom by the support leg of the reinforcement element, resulting in an arrangement of the steering gear in which it is protected against stone impact.

Especially in the large-volume production common for vehicle construction, a simple adaptation of the auxiliary frame to vehicle types having different motorization is logistically advantageous because fewer components have to be kept in stock. During installation of the auxiliary frame, an auxiliary frame basic structure can be provided which can be used independent of the respective vehicle type. The auxiliary frame basic structure forms a pre-assembly unit, preferably a welding assembly, in which the front cross member and the reinforcement element and, depending on the requirements, also the rear joint elements, are connected to each other one-piece, preferably non-detachably. In order to individualize the auxiliary frame, front joint elements that are specially adapted to the particular vehicle type, can be mounted as separate component of the pre-assembly unit. Preferably, the front cross member can be detachably connected at both its front sides that are arranged in the transverse direction, to both front joint elements via third connection sites, for example by a screw connection. The third connection sites and the aforementioned first connection sites (i.e., between the reinforcement element and both front joint elements) are spaced apart from each other via the longitudinal offset mentioned above.

Particularly preferably, the reinforcement element, the front cross member and also the rear node element are non-detachably combined in the pre-assembly unit.

The embodiments and/or refinements of the invention mentioned above and/or in the dependent claims can be used individually or in any desired combinations—except, for instance, in cases of clear dependencies or incompatible alternatives.

The invention and its advantageous embodiments and refinements as well as its advantages are described below by way of drawings. It is shown in:

FIG. 1 in a perspective view, the assembly state of an auxiliary frame;

FIG. 2 a sectional view along the sectional plane I-I of FIG. 1;

FIG. 3 a view according to FIG. 2, at which the front cross member has an open angle section;

FIG. 4 in an exploded view a pre-assembly state of the auxiliary frame.

FIG. 1 shows an auxiliary frame by itself. As viewed in longitudinal direction x of the vehicle the auxiliary frame has respective lateral front joint elements 1, which are here for example formed as box-shaped aluminum cast joints. Both cast joints 1 are connected to an auxiliary frame cross member 3 in transverse direction y of the vehicle. In longitudinal direction x of the vehicle, a flat, plate-shaped reinforcement element 5 adjoins the two front cast joints 1 toward the rear, which reinforcement element 5 is configured framework-like with longitudinal struts 7, cross struts 9 as well as diagonally extending struts 10. At the rear end of the reinforcement element 5, rear joint elements 11 are integrally shaped on the reinforcement element 5 as one piece and of uniform material.

The two front joint elements 1 each have screw sites 13 at their topsides for connection to a not shown longitudinal member of the vehicle body. On the other hand the two rearward joint elements 11 each have screw sites 15 for connection to the longitudinal member at the base of the A-pillar of the vehicle body. Below the screw sites 13 of the two front joint elements 1, a control arm mount 17 with control arm consoles 19 (FIG. 2 or 3) is provided, to which not shown wheel suspension control arms can be articulately connected. The two control arm mounts 17 of the front joint elements 1 guide steering rods of a not shown steering gear, whose installation space 24 (FIG. 2) is located in longitudinal direction x of the vehicle behind the front cross member 3.

Within both rear joint elements 11 control arm consoles 21 are provided for rear wheel suspension control arms.

BRIEF DESCRIPTION OF THE DRAWING

According to FIGS. 1 to 3, the front ends of both longitudinal struts 7 of the reinforcement element 5 are connected at first connection sites I to the two front joint elements 1. Each of the first connection sites I is respectively formed by a rear threaded bushing 23, which is formed on the joint element 1, as well as by a corresponding screw hole 25 (FIG. 4) within the reinforcement element 5, through which a threaded bolt 26 (FIG. 2 or 3) is guided, which clamps the reinforcement element 5 to the threaded bushing 23 of the joint element 1. The cross member 9 extending between the two longitudinal struts 7 is extended frontward with a support leg 27 up to the front cross member 3 in longitudinal direction x of the vehicle, with the support leg being formed one-piece with and of uniform material as, the cross member 9.

According to FIG. 2 or 3, the support leg 27 is non-detachably welded with its front end at a second connection site II to the bottom of the front cross member 3. At the same time, the front cross member 3 is screwed at its front sides, which are oriented in transverse direction y of the vehicle, to corresponding threaded bushings of the front joint elements 1 via third connection sites III (FIG. 1). Preferably, the third connection sites III can for example be realized as a double Z-screw-connection, in which both threaded bolts are offset upwardly and downwardly in transverse direction y of the vehicle.

The support leg 27, which is securely fastened between the front cross member 3 and the reinforcement element 5, forms an additional load path through which the forces occurring during operation can be conducted rearward from the front cross member into the reinforcement element 5. According to FIGS. 2 and 3, the support leg 27 is an approximately horizontally oriented flat section, whereas the front cross member 3 is an on edge section that is positioned in vertical direction of the vehicle.

Overall, this results in an approximately L-shaped stiffening structure, which significantly increases the component stiffness both in the x/y-plane as well as in the y/z-plane in the front region of the auxiliary frame.

According to FIGS. 2 and 3, the first connection site I and the third connection site III are spaced apart from each other via a longitudinal offset ($\Delta_x$). The support leg 27 hereby bridges the longitudinal offset ($\Delta_x$).

DETAILED DESCRIPTION OF PREFERRED EMBODIMENTS

In contrast to FIG. 2, the front cross member 3 In FIG. 3 is not designed as a closed hollow section, but as an open angled section. In this way, additional installation space can be gained, which can be occupied for example by the not shown steering gear.

Figure 1:
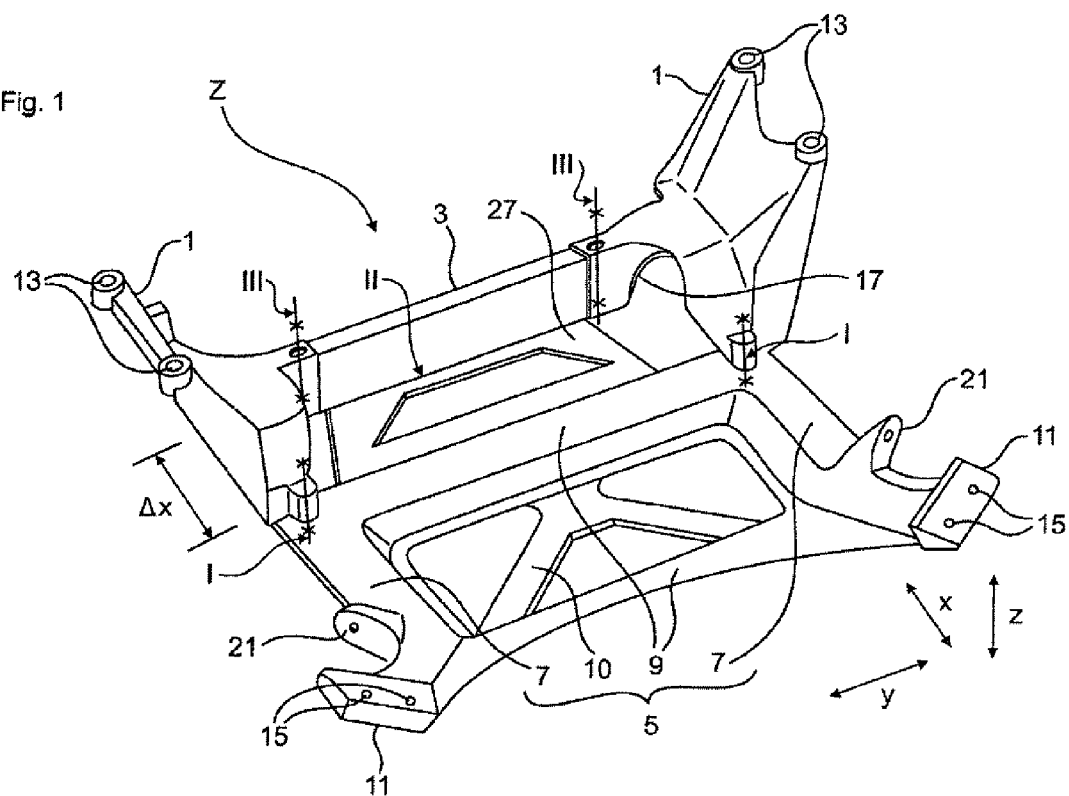
Figure 4:
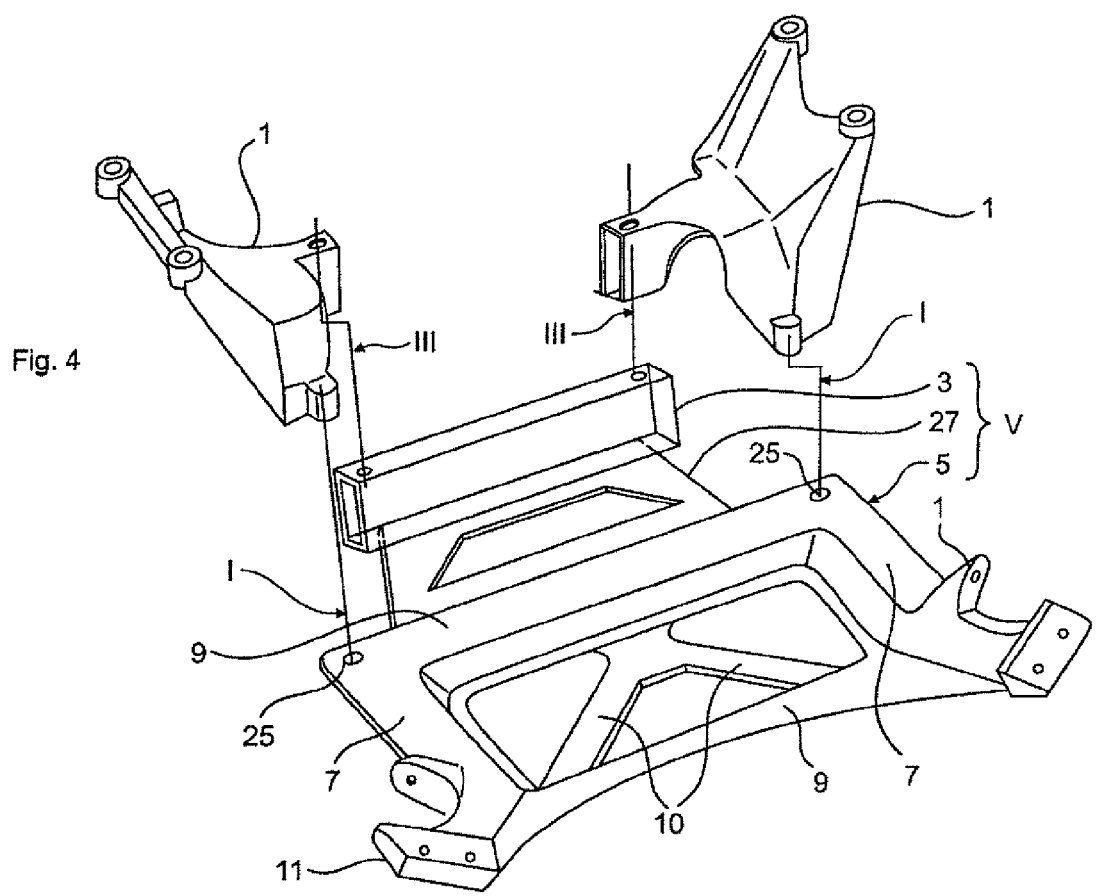

In FIG. 4, the auxiliary frame is shown in a pre-assembly state V. Thus, the reinforcement element 5 and its struts 7, 9, 10 as well as both rear joint elements 11 are combined into a pre-assembly unit, in which all of the above mentioned components are non-detachably connected to each other, for example by a welding connection. The pre-assembly unit V forms an auxiliary frame basic structure, which is used independent of a respective vehicle type during vehicle assembly.

In order to individualize the auxiliary frame, joint elements 1 corresponding to the respective vehicle type or its motorization are selected and as separate components are screwed together with the reinforcement element 5 and with the front sides of the front cross member 3 at the first and third connection sites I, III.

What is claimed is:

1. An auxiliary frame for a motor vehicle, comprising:
    two front joint elements, spaced apart in transverse direction of the vehicle and configured for attachment to a vehicle body;
    a front cross member connecting the two front joint elements;
    a reinforcement element, having rear joint elements spaced apart in the transverse direction of the vehicle for attachment to the vehicle body, said reinforcement element being mounted at first connection sites on the two front joint elements so as to be spaced apart from the front cross member by an offset in longitudinal direction of the vehicle; and
    at least one support leg extending the reinforcement element forwards in the longitudinal direction of the vehicle, and being connected to the front cross member at a second connection site and bridging the longitudinal offset.

2. The auxiliary frame of claim 1, wherein the reinforcement element is detachably connected to the front cross member.

3. The auxiliary frame of claim 2, wherein the support leg extends as a flat section.

4. The auxiliary frame of claim 1, wherein the reinforcement element is connected to the front cross member by a welding connection.

5. The auxiliary frame of claim 1, wherein the second connection site is arranged in the transverse direction of the vehicle between the two front joint elements.

6. The auxiliary frame of claim 5, wherein the support leg is mounted on a bottom side of the front cross member.

7. The auxiliary frame of claim 6, wherein the front cross member is an on edge section, which is mounted in a vertical direction of the vehicle.

8. The auxiliary frame of claim 1, wherein the support leg is of a same material as and/or a one-piece component of the reinforcement element, and/or extends in a horizontal direction.

9. The auxiliary frame of claim 1, wherein the support leg and the front cross member as viewed in cross section form an approximately L-shaped stiffening structure.

10. The auxiliary frame of claim 1, wherein the support leg and the front cross member are non-detachably connected to each other at the second connection site.

11. The auxiliary frame of claim 10, wherein the front cross member is detachably connected to the two front joint elements at respective end sites of the front cross member via respective third connection sites of the two front joint elements.

12. The auxiliary frame of claim 11, wherein the third connection sites are constructed as screw connections.

13. The auxiliary frame of claim 1, wherein the front cross member is constructed as a closed hollow section or an open angled section.

14. The auxiliary frame of claim 1, wherein the reinforcement element is a plate-shaped, flat component, and/or has transverse, diagonally and/or longitudinally extending struts.

15. The auxiliary frame of claim 1, wherein the reinforcement element is configured as a cross strut.

16. The auxiliary frame of claim 1, wherein an installation space for a steering gear is provided behind the front cross member in longitudinal direction of the vehicle, said installation space being delimited downward by the support leg.

17. The auxiliary frame of claim 1, wherein in a pre-assembly state of the auxiliary frame, the front joint elements are components that are separate from each other, and in an assembled state of the auxiliary frame are mounted to the reinforcement element at the first, second and/or third connection sites.

18. The auxiliary frame of claim 1, wherein the reinforcement element, the front cross member and/or the rear joint elements are combined in a pre-assembly unit.

19. A method comprising:
    connecting a cross member and a reinforcement element to provide a pre-assembly unit as auxiliary frame basic structure; and
    mounting selected ones of front joint elements as separate components to the pre-assembly unit to produce an auxiliary frame for a desired vehicle type.

20. The method of claim 19, further comprising connecting rear joint elements to the reinforcement element in spaced-apart relation in a transverse direction of the vehicle for attachment to a vehicle body.

* * * * *